US010702928B2

(12) United States Patent
Bickhard et al.

(10) Patent No.: US 10,702,928 B2
(45) Date of Patent: Jul. 7, 2020

(54) METHOD AND APPARATUS FOR ACOUSTIC PERFORATION OF CORE SANDWICH PANELS

(71) Applicant: Spirit AeroSystems, Inc., Wichita, KS (US)

(72) Inventors: Matt D. Bickhard, Wichita, KS (US); Mark Wadsworth, Wichita, KS (US); Floyd Stephen Corby, Wichita, KS (US); Brian Kitt, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 326 days.

(21) Appl. No.: 15/431,347

(22) Filed: Feb. 13, 2017

(65) Prior Publication Data

US 2018/0229313 A1 Aug. 16, 2018

(51) Int. Cl.
B32B 41/00 (2006.01)
B23B 39/08 (2006.01)
B32B 38/00 (2006.01)
B32B 3/12 (2006.01)
B32B 15/20 (2006.01)
B23Q 17/24 (2006.01)
G05B 19/18 (2006.01)
B23B 35/00 (2006.01)

(52) U.S. Cl.
CPC ............. B23B 39/08 (2013.01); B23B 35/00 (2013.01); B23Q 17/24 (2013.01); B32B 3/12 (2013.01); B32B 15/20 (2013.01); B32B 38/0004 (2013.01); G05B 19/18 (2013.01); B23B 2215/04 (2013.01); B23B 2228/36 (2013.01); B23B 2260/128 (2013.01); B23B 2270/48 (2013.01); B32B 2605/18 (2013.01)

(58) Field of Classification Search
CPC . B23B 39/08; B23B 2215/04; B23B 2270/48; B23B 2260/128; B23B 2228/36; B23Q 17/20; B32B 15/20; B32B 38/0004; B32B 3/12; B32B 2605/18; G05B 19/054; G05B 2219/15117
USPC .......................... 156/64, 350, 351, 378, 379
See application file for complete search history.

(56) References Cited

U.S. PATENT DOCUMENTS 6,609,592 B2    8/2003  Wilson
2005/0178489 A1*  8/2005  Belleguic ............. G10K 11/172
                                                    156/64
2015/0336180 A1* 11/2015  Ramage ................ B23B 39/161
                                                    156/214

(Continued)

Primary Examiner — Michael N Orlando
Assistant Examiner — Joshel Rivera
(74) Attorney, Agent, or Firm — Hovey Williams LLP

(57) ABSTRACT

An acoustic perforation method and assembly for forming holes or perforations into a face sheet of a sandwich panel without damaging a honeycomb core thereof. The method may include photographing or otherwise scanning the face sheet bonded to the honeycomb core after cure, then detecting locations of cell walls of the honeycomb core via image processing or analysis of scan data obtained. For example, discolorations on the face sheet or coatings applied thereto may indicate locations of the cell walls of the honeycomb core. A perforation pattern may then be generated or altered based on the detected locations of the cell walls, and a perforation device may be commanded to perforate the face sheet in accordance with the perforation pattern at locations where the cell walls are not located.

12 Claims, 3 Drawing Sheets

(56) References Cited

U.S. PATENT DOCUMENTS

2016/0031163 A1* 2/2016 Wadsworth ............ B29C 70/34
                                                                                         156/64
2018/0257196 A1* 9/2018 Simpson ................. B32B 7/05

\* cited by examiner

METHOD AND APPARATUS FOR ACOUSTIC PERFORATION OF CORE SANDWICH PANELS

BACKGROUND

Sandwich panels are often used in aircraft nacelle walls to dampen the effects of engine noise. A typical sandwich panel includes a honeycomb core with an inner face sheet and an outer face sheet. The inner face sheet is often perforated with a plurality of holes drilled or otherwise formed therein. Unfortunately, the drilling process will occasionally hit a cell wall of the honeycomb core beneath the inner face sheet, causing a structural defect. In the case of aluminum honeycomb cores, the drill may nick the aluminum, creating a corrosion point where a corrosion-protection primer on the core is inadvertently damaged and thus removed. Fiberglass honeycomb core may be less prone to this type of damage, but fiberglass core is typically more expensive than aluminum core and does not have the high thermal conductivity often desired for the inner duct wall of an aircraft nacelle.

It is possible to drill the perforations into the face sheet prior to attachment to the honeycomb core, but this can lead to some of the perforations being blocked by adhesive and cell walls, thus diminishing acoustic performance. Furthermore, this method requires additional cure cycles, and the additional thermal exposure limits the number of allowable repairs in the sandwich panel's life.

Accordingly, there is a need for improved methods and assemblies for fabricating nacelle sandwich panels without damaging the honeycomb core therein.

SUMMARY

Embodiments of the present invention provide a method for perforating a sandwich panel having a face sheet bonded to a core with a plurality of cell walls. The method may include the steps of receiving an image or scan data from an imaging device of an outer surface of the face sheet, detecting locations of the cell walls of the core in the image or based on the scan data received, and then commanding a perforation device to perforate the face sheet in locations where the cell walls are not located, based on the detecting step.

Other embodiments of the invention provide a method of manufacturing a sandwich panel and perforating its face sheet. The method may include a step of placing or attaching a face sheet against edges of cell walls of a honeycomb core, with the face sheet sandwiched between the honeycomb core and a surfacer coating applied to the face sheet. Then the method may include a step of curing the face sheet, the honeycomb core, and the surfacer coating. Next, the method may include the steps of transmitting to a processor an image or scan data, from an imaging device, of the surfacer after curing thereof, then detecting with the processor locations of the cell walls of the honeycomb core via image processing of the image or based on the scan data received. The method may further include a step of generating or altering a perforation pattern to be applied to the face sheet based on the detected locations of the cell walls, such that any perforations of the perforation pattern corresponding in location with the cell walls is omitted from or relocated within the generated or altered perforation pattern. Finally, the method may include a step of commanding a perforation device to perforate the face sheet in locations where the cell walls are not located, based on the generated or altered perforation pattern.

Yet another embodiment of the invention is an acoustic perforation assembly for a sandwich panel with at least one face sheet bonded to a core having a plurality of cell walls. The assembly may include an imaging device to scan or photograph the face sheet, a perforation device to perforate the face sheet at a plurality of locations thereon, and a processor communicably coupled to the imaging device and the perforation device. The processor may be programmed or otherwise designed to receive an image or data from the imaging device, detect locations of the cell walls of the core in the image or based on the data, and command the perforation device to perforate the face sheet in locations where the cell walls are not located, based on the detecting step.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
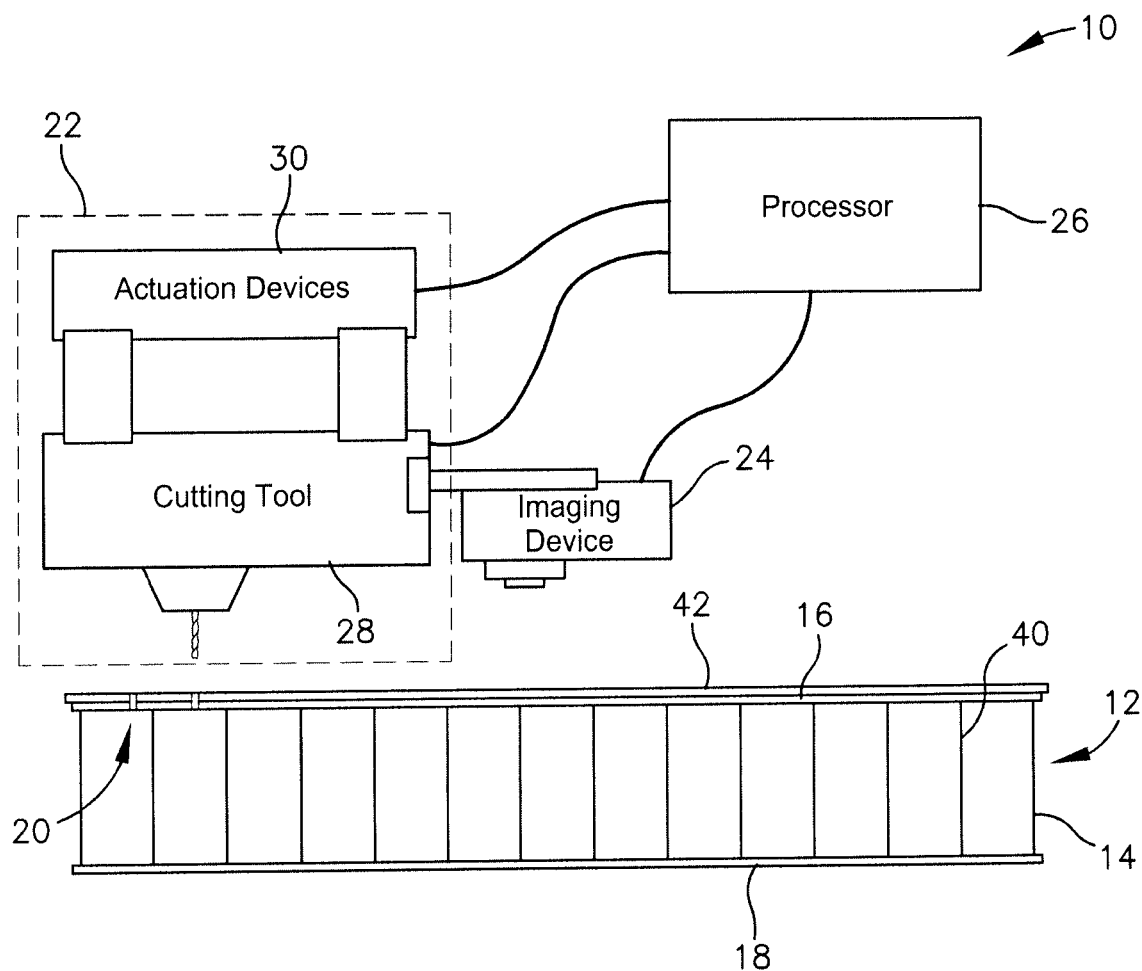
FIG. 1 is a schematic view of an assembly for sandwich panel perforation constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention comprise a perforation assembly 10 and methods for perforating a sandwich panel 12 comprising a core 14 sandwiched between an inner face sheet 16 and an outer face sheet 18. The core 14 may be made of metal such as aluminum, composite material, fiberglass, or other rigid materials known in the art for use in cores such as honeycomb cores. The core 14 may be made up of a plurality of cell walls 40 cooperatively forming a plurality of cells having any desired cross-sectional geometry, such as a hexagon, octagon, square, rectangle, triangle, circle, or the like. Specifically, the term honeycomb core typically refers to core having a repeated pattern of hexagons and is frequently used in sandwich panels for aircrafts.

The face sheets 16,18 may be made of carbon composite material or any composite material known in the art. The inner and outer face sheets 16,18 may be cured, co-cured, or otherwise adhered to the core 14 prior to perforation of the inner and/or outer face sheets 16,18, as later described herein. Perforations 20, as described herein, are small holes or openings formed through at least one of the face sheets 16,18. The perforations may have any shape and are each individually smaller in area than the area of the cell walls 40 of the core 14.

An embodiment of the perforation assembly 10 is shown in FIG. 1 and includes a perforation device 22, an imaging device 24, and a processor 26 communicably coupled to the perforation device 22 and the imaging device 24.

The perforation device 22 may include a cutting tool 28 such as a drill, laser-cutting tool such as a laser drill, or any device capable of cutting one or more perforations 20 into a composite part of one of the face sheets 16,18. The cutting tool 28 may additionally or alternatively include a plurality of cutting tools configured to simultaneously form a plurality of perforations into one of the face sheets 16,18. Furthermore, the perforation device 22 may include and/or be attached to one or more actuation devices 30 configured to move the cutting tool 28 along a surface of the inner or outer face sheet 16,18 as the cutting tool 28 is forming the perforations 20. For instance, a robotic arm or CNC machine may move the cutting tool 28 a pre-selected distance between each perforation 20 and/or may move the cutting tool 28 in accordance with a pre-programmed perforation pattern.

The imaging device 24 may comprise a camera, an infrared camera, an infrared thermography (IRT) sensor, an infrared 3D scanner, an ultrasonic sensor such as a through-transmission ultrasonic (TTU) inspection system or device, a portable X-ray device, a backscatter X-ray device, an eddy current metal detection sensor, or the like. The camera may be, for example, a digital camera configured to obtain still or video images of the sandwich panel 12 to transmit to the processor 26 in the form of data or digital images or video. However, any camera known in the art may be used without departing from the scope of the invention. The TTU inspection systems and/or devices such as those described in U.S. application Ser. No. 14/451,028 and U.S. application Ser. No. 14/717,592, both of which are incorporated by reference herein in their entireties. Note that other sensors or cameras capable of detecting an outline pattern of the cell walls 40 while the face sheets 16,18 are attached thereto may be used as the imaging device 24 without departing from the scope of the invention.

The imaging device 24 and the perforation device 22 may both be communicably coupled to the processor 26 through wired or wireless communication devices known in the art. The imaging device 24 and the perforation device 22 may be physically spaced apart and independently moveable relative to each other or may alternatively be physically attached or otherwise physically coupled together. For example, the imaging device 24 may be physically coupled to or within a housing of the cutting tool 28 such that the actuation devices 30 simultaneously move the cutting tool 28 and the imaging device 24 along the one of the face sheets 16,18, particularly for embodiments of the invention in which data from the imaging device 24 is used substantially in real-time by the processor 26 to determine locations of cell walls 40 of the core 14 before creating the perforations 20 in the inner face sheet 16.

The processor 26 may comprise any number and combination of controllers, circuits, integrated circuits, programmable logic devices such as programmable logic controllers (PLC) or motion programmable logic controllers (MPLC), computers, microcontrollers, other electrical and computing devices, and/or other data and signal processing devices for carrying out the functions described herein, and may additionally comprise one or more memory storage devices, transmitters, receivers, and/or communication busses and ports. The processor 26 may be configured for one-way and/or two-way communication with the perforation device 22 and/or the imaging device 24 via wireless communications devices and standards, such as Wi-Fi or the like, or via hardwired connections, such as via USB cables or the like. For example, the processor 26 may be configured to send commands to the cutting tool 28 and/or the actuation devices 30 for positioning, activation, and actuation thereof. Likewise, the processor 26 may be configured to send commands to the imaging device 24 to capture images or other sensed data from the sandwich panel 12 and may be configured to receive that data from the imaging device 24.

The processor 26 may be configured to implement any combination of the algorithms, subroutines, or code corresponding to method steps and functions described herein. The processor 26 and computer programs described herein are merely examples of computer equipment and programs that may be used to implement the present invention and may be replaced with or supplemented with other controllers and computer programs without departing from the scope of the present invention. While certain features are described as residing in the imaging device 24 or the processor 26, the invention is not so limited, and those features may be implemented elsewhere. For example, databases accessed by the processor 26 may be located remotely from the processor 26 without departing from the scope of the invention.

In some embodiments of the invention, the processor 26 may comprise several separate processors or computing devices communicably coupled with each other to perform one or more of the method steps described below. For example, the several processors or computing devices may communicate and exchange information with each other and may be located in remote locations relative to each other. Furthermore, the several processors or computing devices may each be configured to execute different steps, algorithms, subroutines, or codes described herein.

In various embodiments of the invention, the processor 26 may implement a computer program and/or code segments to perform some of the functions described herein. The computer program may comprise an ordered listing of executable instructions for implementing logical functions in the processor 26. For example, the computer program may be a software program configured to run on a personal computer, laptop, tablet, or a mobile communications device. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RSMMC), secure digital (SD) cards such as microSD or miniSD, and a subscriber identity module (SIM) card.

As noted above, the processor 26 may comprise memory storage devices or other various memory elements. The memory may include one or more memory storage devices which may be integral with the processor 26, stand-alone memory, or a combination of both. The memory may include, for example, removable and non-removable memory elements such as RAM, ROM, flash, magnetic, optical, USB memory devices, MMC cards, RS MMC cards, SD cards such as microSD or miniSD, SIM cards, and/or other memory elements. Specifically, the memory may store at least a portion of the computer program or code segments described above, as well as user-specified preferences, information regarding user selections, sandwich panel or aircraft component specifications and/or three-dimensional computer models, pattern and/or spacing information regarding desired locations of one or more perforations relative to core cell walls or other features of the sandwich panel 12, and the like. Various known software programs, computer program languages, and applications may be stored in the memory of the processor 26 and/or accessed by the processor 26, such as CATIA, AutoCAD, Windows XP, RGS Sender, knowledge-based engineering (KBE) applications, and the like.

A method of perforating the sandwich panel 12 may generally comprise receiving an image or image data from the imaging device 24, detecting locations of the cell walls 40 of the core 14 in the image or via the image data, and commanding the perforation device 22 to perforate the inner or outer face sheet 16,18 in locations where the cell walls 40 are not located, based on the detecting step. For example, for aircraft nacelles, the sandwich panel 12 may include perforations on the inner face sheet 16 but not on the outer face sheet 18. However, any number of face sheets on the core 14 may be perforated using the method steps described herein without departing from the scope of the invention.

Figure 5:
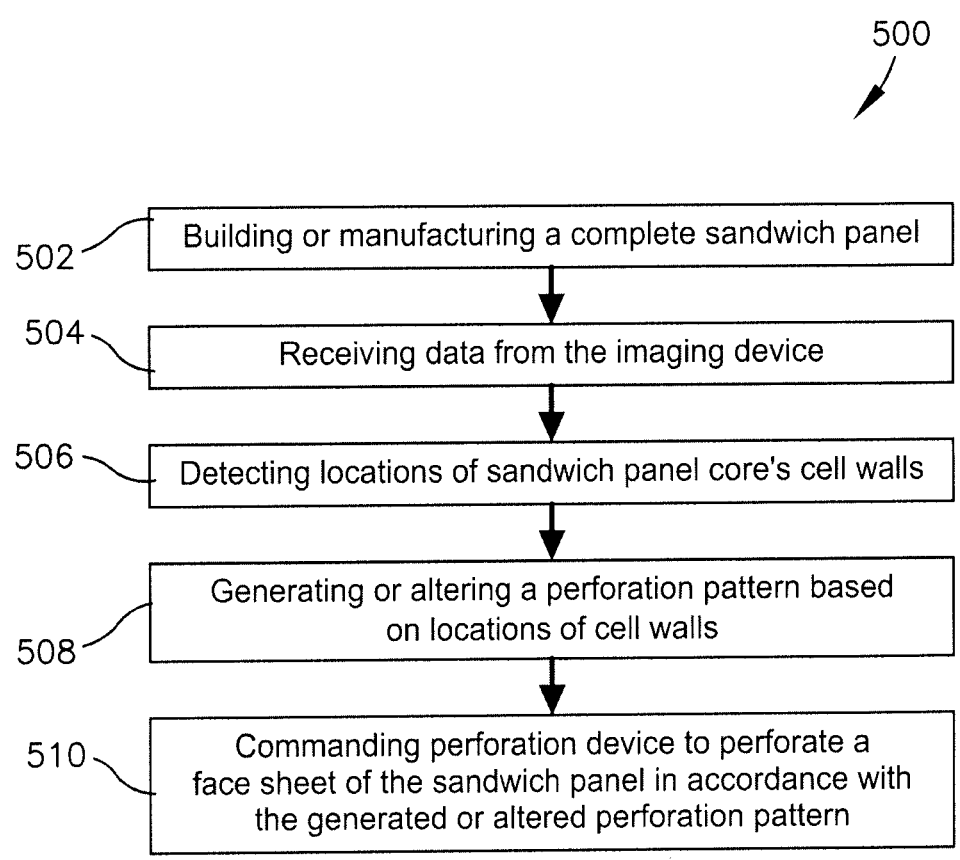
FIG. 5 is a flow chart depicting steps in a method of sandwich panel perforation in accordance with an embodiment of the present invention.

The flow chart of FIG. 5 depicts the steps of an exemplary method 500 for perforating a sandwich panel. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

As illustrated in FIG. 5, the method 500 may include a step of building or manufacturing a complete sandwich panel, such as the sandwich panel 12 described herein, as depicted in block 502. This may include, for example, machining or otherwise forming the core 14 and/or receiving the core 14 from a third party and bonding, adhering, or otherwise attaching the inner face sheet and the outer face sheet 16,18 to opposing sides of the core 14. The step of bonding may include curing the face sheets 16,18 and the core 14 together. However, any methods and techniques known in the art for forming the sandwich panel 12 may be used without departing from the scope of the invention.

Figure 2:
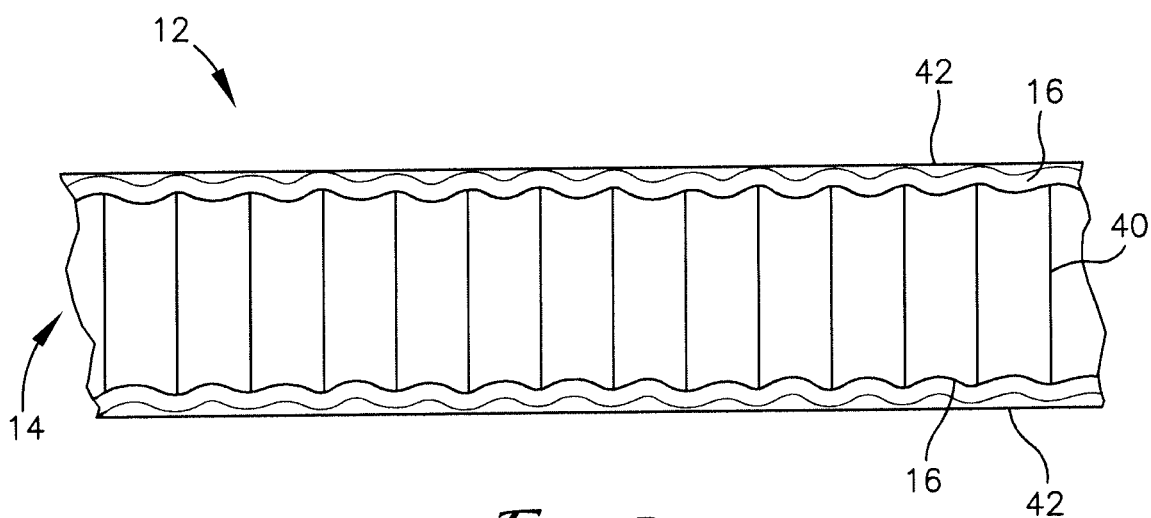
FIG. 2 is a cross-sectional view of a sandwich panel, after curing thereof, to be perforated by the assembly of FIG. 1.

In some embodiments of the invention, as illustrated in FIG. 2, a surfacer 42 or coating, such as a translucent protective coating, may be placed on an outer surface of one or both of the face sheets 16,18 during the building or manufacturing step 502. The inventors have discovered that this surfacer 42 often yields a distinct visible pattern on the surface of the face sheets 16,18 after cure, allowing for the method described herein. In some instances, this may be due to uneven pressure caused by core 14, such that the surfacer 42 is thicker in some locations between cell walls 40 than in other locations corresponding with the cell walls, as shown in exaggerated fashion in FIG. 2. As such, the difference in color, brightness, or hue in the image of the face sheets 16,18 after cure may readily indicate locations of the cell walls 40. For example, if the surfacer 42 is a translucent blue color and the underlying face sheet 16 is black, the processor 26 may run image analysis to determine which pixels in a digital image are blue and which are black. Note that cell walls may be detected using other phenomenon or techniques without departing from the scope of the invention.

Next, the method 500 may include a step of receiving data from the imaging device 24, as depicted in block 504. The data may be an image or scan data representative of an outer surface of the face sheet 16,18 and/or the surfacer 42. This step may include the imaging device 24 or camera taking a picture and then transmitting that picture to the processor 26 for analysis. In some embodiments of the invention, this step may be performed during routine TTU inspection or the like via the TTU inspection system noted above. For example, C-scan data from the TTU inspection may serve its primary purpose of identifying defects, and also be post-processed by computer programming in the processor 26 in order to relate features such as edge contours and holes to corresponding features present in a CAD definition of the sandwich panel 12 stored in memory, stretching, skewing, and translating the raw TTU data to fit the CAD geometry.

The method 500 may then include a step of detecting locations of the cell walls 40 of the core 14 in the image and/or the TTU or C-scan data, as depicted in block 506. For example, as noted above, the distinct visible pattern on the surface of the face sheets 16,18 after cure may provide a discoloring either between the cell walls 40 or at locations where the cell walls 40 meet the face sheet 16,18. This pattern can thus be identified using various image processing techniques for identifying patterns based on lightness/darkness of pixels, color of pixels, or any other image processing techniques known in the art. Such techniques may also be used to identify the cell walls 40 or cell wall center lines using the TTU data.

Figure 3:
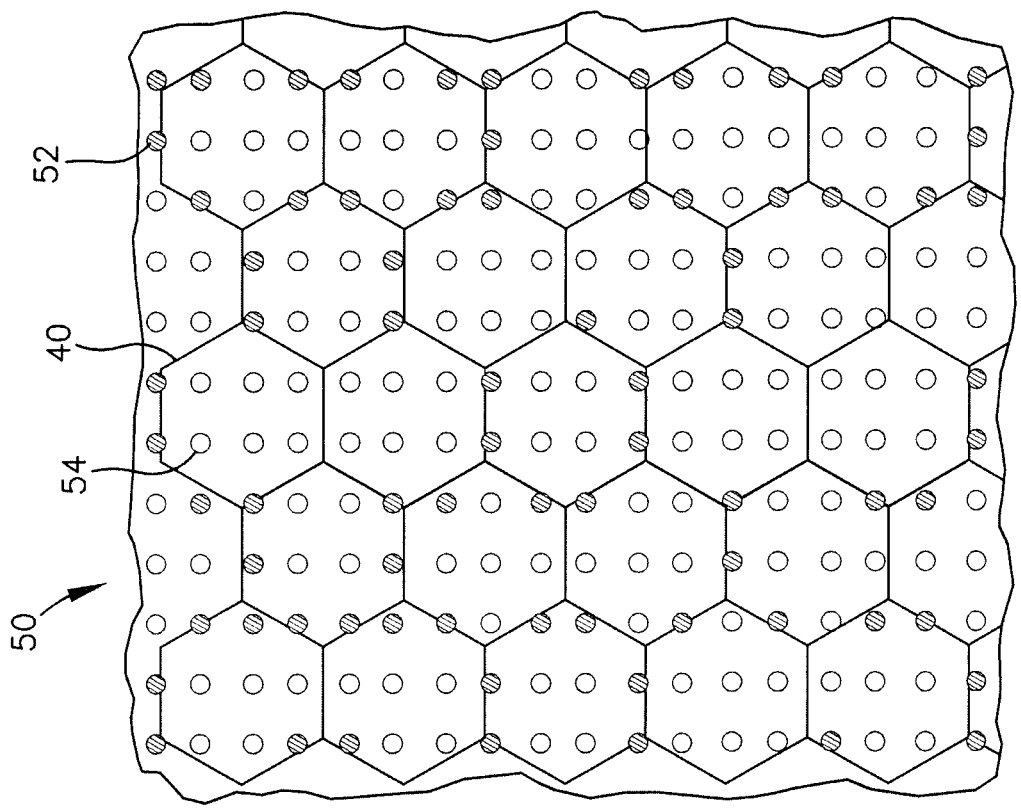
FIG. 3 is a plan view of the sandwich panel of FIG. 2 with a perforation pattern overlaid thereon according to an embodiment of the present invention.

Next, the method 500 may include a step of generating or altering a perforation pattern 50 to be applied to the face sheet 16,18 based on the detected locations of the cell walls 40, as depicted in block 508. Specifically, if a perforation pattern 50 is already stored, the processor 26 may overlay that perforation pattern 50 onto the pattern of the cell walls 40 detected and remove any individual perforations from the perforation pattern 50 for each perforation that happens to coincide with one of the cell walls 40 of the core 14. For example, as illustrated in FIG. 3, the perforations 52 with cross-hatching therein coincide with the detected locations of cell walls 40 and would therefore be eliminated from the perforation pattern 50 to be applied to the face sheet 16,18, while the remaining perforations 54 would be applied by the cutting tool 28 to the face sheet 16,18.

Figure 4:
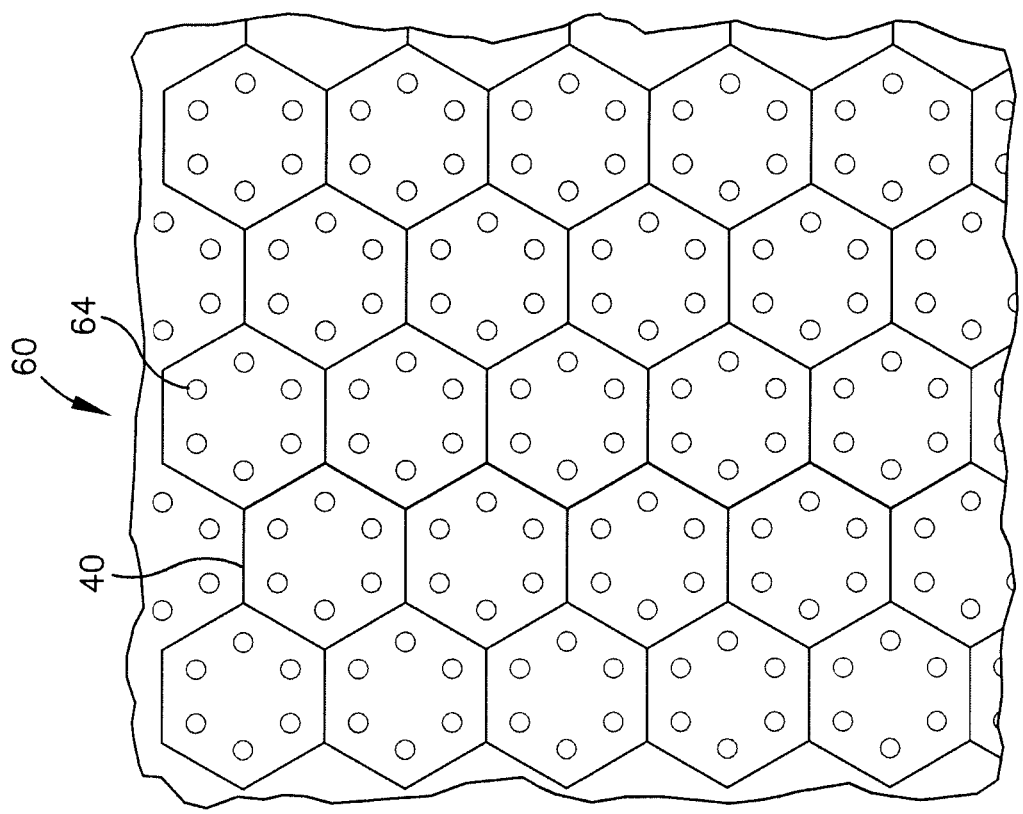
FIG. 4 is a plan view of the sandwich panel of FIG. 2 with a perforation pattern overlaid thereon according to an alternative embodiment of the present invention.

Alternatively, as illustrated in FIG. 4, the processor 26 may generate a repeating perforation pattern 60 based on detected locations of the cell walls 40 in order to avoid drilling or cutting perforations in locations that would coincide with the cell walls 40. For example, FIG. 4 illustrates the repeating perforation pattern 60 as including a predetermined identical number and pattern of perforations 64 within the boundaries of each cell of the core 14.

Finally, the method 500 may include a step of commanding the perforation device 10 to perforate the face sheet 16,18 in locations where the cell walls 40 are not located, as depicted in block 510, based on determinations made in steps 506 and/or 508. For example, the processor 26 may command the actuation devices 30 to actuate the cutting tool 28 to various locations along the face sheet 16,18 and may command the cutting tool 28 to form each perforation of the perforation pattern 50 or the perforation pattern 60. This may require careful placement, calibration, and proper registration between the cutting tool 28 and the face sheet 16,18 or sandwich panel 12 to ensure that the perforation patterns 50 or 60 properly align with the cell walls 40. For example, mounting holes or other features may be used for mapping or indexing prior to application of the perforation pattern 50,60.

Additionally or alternatively, the determination of whether or not a cell wall coincides with a pre-determined perforation location may be made substantially in real-time and then cut or not cut accordingly, one at a time or a segment at a time. That is, instead of analyzing an entire image or detected core cell wall pattern and determining the entire perforation pattern to be adjusted or generated before performing the cuts or perforations, this may be done on-the-fly. For example, the imaging device 24 may be attached to the cutting tool 28 and directed toward a location at which the cutting tool 28 is presently positioned or at a location where the cutting tool 28 will traverse next. If that location to be cut presents image data, TTU data, or the like indicating that a cell wall coincides therewith, then the actuation devices 30 may relocate the cutting tool 28 to a next desired perforation location, according to pre-stored and/or predetermined perforation patterns or according to pre-determined minimum or maximum perforation spacing.

Advantageously, the sandwich panel 12 can be perforated after a final or top-stage cure cycle without risking any corrosion issues with aluminum core. Furthermore, the assembly of the sandwich panel 12 using the perforation methods described herein generally require a lower cost and flow time than prior art methods. The methods described herein may also be performed after TTU inspection, eliminating the need to tape over holes in preparation for TTU inspection of the sandwich panel.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for perforating a sandwich panel including a face sheet having an outer surface and an inner surface, the inner surface being bonded to a core having a plurality of cell walls, the method comprising:
   receiving data representative of the outer surface of the face sheet from an imaging device, wherein the data is a digital image from the imaging device, wherein the face sheet has a surfacer coating applied thereto, wherein variations due to pressure by the honeycomb core during curing of the sandwich panel causes a visible pattern in the surfacer coating corresponding to locations of the cell walls,
   detecting locations of the cell walls of the core based on at least one of color, hue, or brightness in the digital image, and
   commanding a perforation device to perforate the face sheet in locations where the cell walls are not located, based on the detecting step.

2. The method of claim 1, further comprising a step of a processor generating or altering a perforation pattern to be applied to the face sheet based on detected locations of the cell walls, such that any perforations of the perforation pattern corresponding in location with the cell walls is omitted from the generated or altered perforation pattern, wherein the commanding step is performed by the processor in accordance to the generated or altered perforation pattern.

3. The method of claim 2, wherein the perforation device comprises a cutting tool and one or more actuators for positioning the cutting tool relative to the face sheet, wherein the step of commanding the perforation device to perforate the face sheet includes commanding the actuators to relocate the cutting tool to a next position on the face sheet to be perforated according to the generated or altered perforation pattern and commanding the cutting tool to form the perforation at the next position on the face sheet.

4. The method of claim 1, further comprising a step of a processor generating a repeating perforation pattern to be applied to the face sheet based on detecting locations of the cell walls, wherein the repeating perforation pattern includes a predetermined number of perforations placed within each of a plurality of cells determined by the locations of the cell walls, wherein the commanding step is performed by the processor in accordance with the generated repeating perforation pattern.

5. The method of claim 1, wherein the perforation device comprises a cutting tool and one or more actuators configured for positioning the cutting tool relative to the face sheet, wherein the imaging device is physically coupled to the cutting tool and is positionable therewith via the actuators, further comprising repeating the detecting and commanding steps for a plurality of pre-determined perforation locations, wherein the step of commanding the perforation device to perforate the face sheet in locations where the cell walls are not located includes:
   determining if any of the cell walls coincides with a current position of the cutting tool based on at least one of color, hue, or brightness in the digital image from the imaging device,
   moving to a next position of the plurality of pre-determined perforation locations if the current position does coincide with any of the cell walls, and instructing the cutting device to create the perforation at the current position if the current position does not coincide with any of the cell walls.

6. A method for manufacturing a sandwich panel, the method comprising the steps of:

placing or attaching at least one face sheet against edges of cell walls of a honeycomb core, with the face sheet sandwiched between the honeycomb core and a surfacer coating applied to the face sheet;

curing the face sheet, the honeycomb core, and the surfacer coating so that variations due to pressure by the honeycomb core causes a visible pattern in the surfacer coating corresponding to locations of the cell walls;

transmitting to a processor an image, from an imaging device comprising a camera or an X-ray device, of the surfacer after curing thereof;

detecting, with the processor, locations of the cell walls of the honeycomb core based on at least one of color, hue, or brightness in the image;

generating or altering, with the processor, a perforation pattern to be applied to the face sheet based on the detected locations of the cell walls, such that any perforations of the perforation pattern corresponding in location with the cell walls is omitted from or relocated within the generated or altered perforation pattern; and commanding a perforation device to perforate the face sheet in locations where the cell walls are not located, based on the generated or altered perforation pattern.

7. The method of claim 6, wherein the perforation device comprises a cutting tool and one or more actuators for positioning the cutting tool relative to the face sheet, wherein the step of commanding the perforation device to perforate the face sheet includes commanding the actuators to relocate the cutting tool to a next position on the face sheet to be perforated according to the generated or altered perforation pattern and commanding the cutting tool to form the perforation at the next position on the face sheet.

8. The method of claim 6, wherein the generating or altering step comprises generating the perforation pattern as a repeating perforation pattern including a predetermined number of perforations placed within each of a plurality of cells determined by the locations of the cell walls.

9. The method of claim 1, wherein the outer surface of the face sheet is opaque.

10. The method of claim 1, wherein the face sheet comprises carbon composite material.

11. The method of claim 1, further comprising perforating the face sheet at the locations where the cell walls are not located.

12. The method of claim 1, further comprising positioning the perforation device over the face sheet with the imaging device attached to the perforation device, and repositioning the perforation device if a position of the perforation device is above one of the cell walls of the core.

* * * * *